(No Model.)

R. N. ALLEN.
ELECTRICALLY PROPELLED VEHICLE.

No. 405,978. Patented June 25, 1889.

Witnesses:
Raphael Netter
Ernest Hopkinson

Inventor
Richard N. Allen
by
Duncan, Curtis & Page
Attorneys.

UNITED STATES PATENT OFFICE.

RICHARD N. ALLEN, OF CLEVELAND, OHIO.

ELECTRICALLY-PROPELLED VEHICLE.

SPECIFICATION forming part of Letters Patent No. 405,978, dated June 25, 1889.

Application filed March 11, 1889. Serial No. 302,794. (No model.)

*To all whom it may concern:*

Be it known that I, RICHARD N. ALLEN, of the city of Cleveland, in the county of Cuyahoga and State of Ohio, have invented certain new and useful Improvements in Electrically-Propelled Vehicles, of which the following is a specification, reference being had to the accompanying drawings.

This invention is an improvement in electrically-propelled vehicles—such as tram-cars—the object of which is to provide a more simple and effective system of motion transmitting and reducing connections between the motor-shaft and the driving-wheels of the car.

The invention consists in the combination, with friction wheels or disks on the axle or axles of the car and the shaft of the driving motor or motors, of intermediate friction-disks carried by a pivoted lever or frame adapted to be held in engagement with both the other friction-wheels by an adjustable spring-pressure.

More specifically stated, the invention is carried out in the following manner.

The motor or motors for driving the car are mounted on a truck supported by the axles of the ordinary car-wheels. The motor-shaft carries one or more friction-pulleys and the car-axle carries corresponding friction pulleys or drums of considerably-greater diameter than those on the motor-shaft. The motor-pulleys and their corresponding driving-drums are separated by a short space, and motion is transmitted from one to the other by intermediate friction-wheels carried by a lever or frame pivoted to the truck. This frame is held by an adjustable spring in a position which forces the wheels which it carries firmly into contact with the pulleys or drums of the motor and axle. The spring is made adjustable, so that the pressure between the said pulleys and wheel may be regulated according to necessity.

This device is illustrated in the accompanying drawings, in which—

Figure 1:
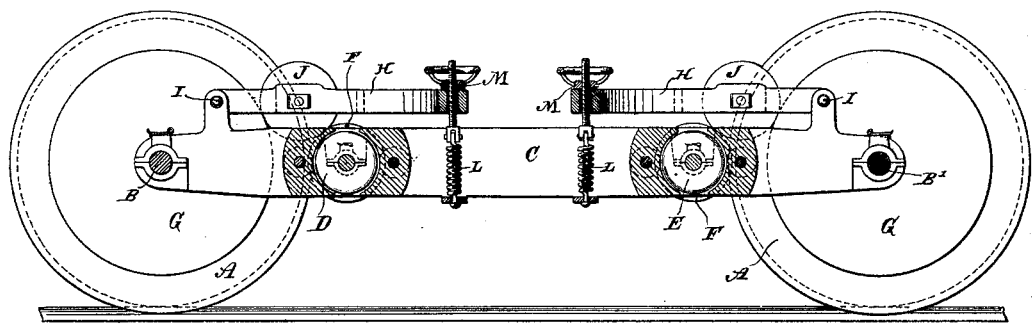
Figure 2:
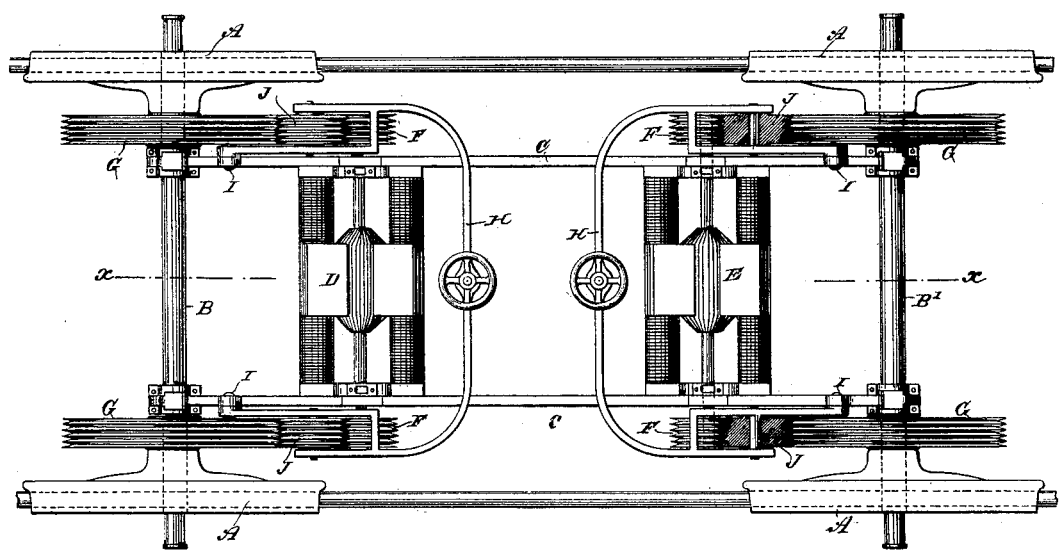

Figure 1 is a central section, through the line *v v* of Fig. 2, of a car-truck with the invention applied thereto, and Fig. 2 is a plan view and part section of the same.

A A designate the wheels of a vehicle—such as a street-car—and B B' the axles thereof journaled in suitable bearings in or supporting a truck or frame C. In the present case two motors D and E are shown as mounted on the truck, their shafts parallel to the axles B B'. In addition to the commutator and in lieu of the ordinary driving-pulley, each motor-shaft is provided with one or preferably two friction disks or pulleys F, which are secured to the shaft outside its bearings. In other respects the motors are of the ordinary construction and need no further description.

The axles B B' carry friction pulleys or drums G G, corresponding to the pulleys F, but not engaging directly with the same.

H is a frame pivoted to the truck at I. Its construction may be varied in many ways, it being only required that it carry the friction-wheels J J in position to be brought by the swinging movement of the frame into engagement with the pulleys and drums F and G. The frame H is held in position to press the wheels J J upon the pulleys or drums F and G by means of a stout spring L secured to the truck, the tension of said spring being made adjustable by the nut M, or any equivalent device.

I prefer to use the grooved pulleys or drums shown; but I may use other forms if so desired.

When the springs L are adjusted to the required tension, the motion of the motor-shaft will be transmitted evenly and smoothly to the axles. In case of too great a strain or overloading of the motor, or of a sudden stoppage or starting of the same, the frictional connection between the pulleys permits the same to slip or the frame H to yield, so that shocks and undue wear are prevented.

I am aware that intermediate friction-wheels between the motor-shaft and car-axle are not broadly new and I do not broadly claim them.

Having thus described a specific way of carrying out the invention, I would state that I regard the special way of mounting the motor, or the location of the pivoted point of the frame H, and other minor features, as matters of mere detail that may be varied at will.

What I claim is—

The combination, with the motor-shaft and car-axle, both provided with friction pulleys or drums, of a pivoted lever or frame, friction-wheels carried thereby and adapted to be brought by the frame into contact with both pulleys or drums, and an adjustable spring-connection between the frame and a fixed support, the tension of which acts to force the friction-wheels against the pulleys and drums, as set forth.

RICHARD N. ALLEN.

Witnesses:
ROBT. H. DUNCAN,
ROBT. F. GAYLORD.